Patented July 10, 1928.

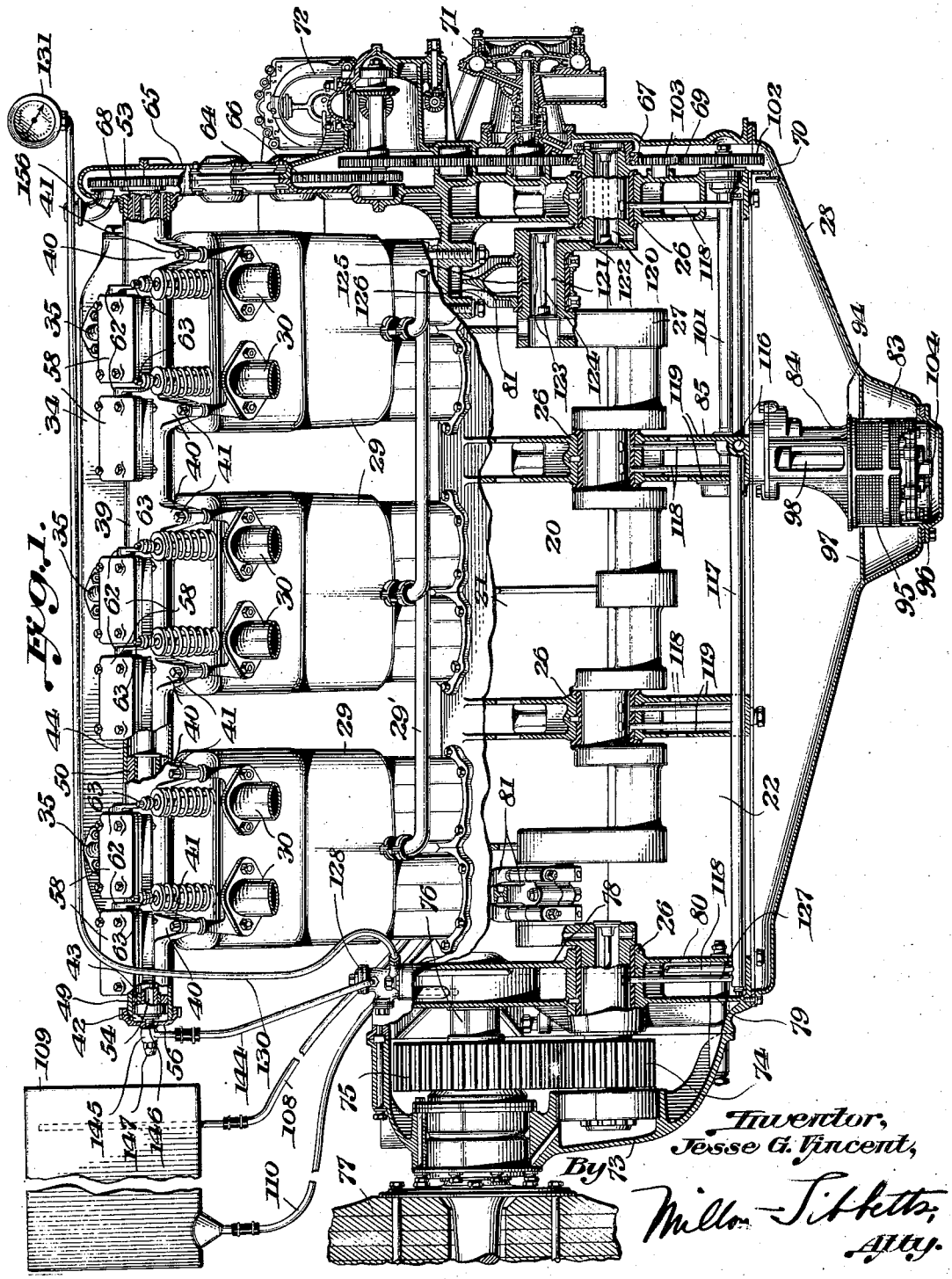

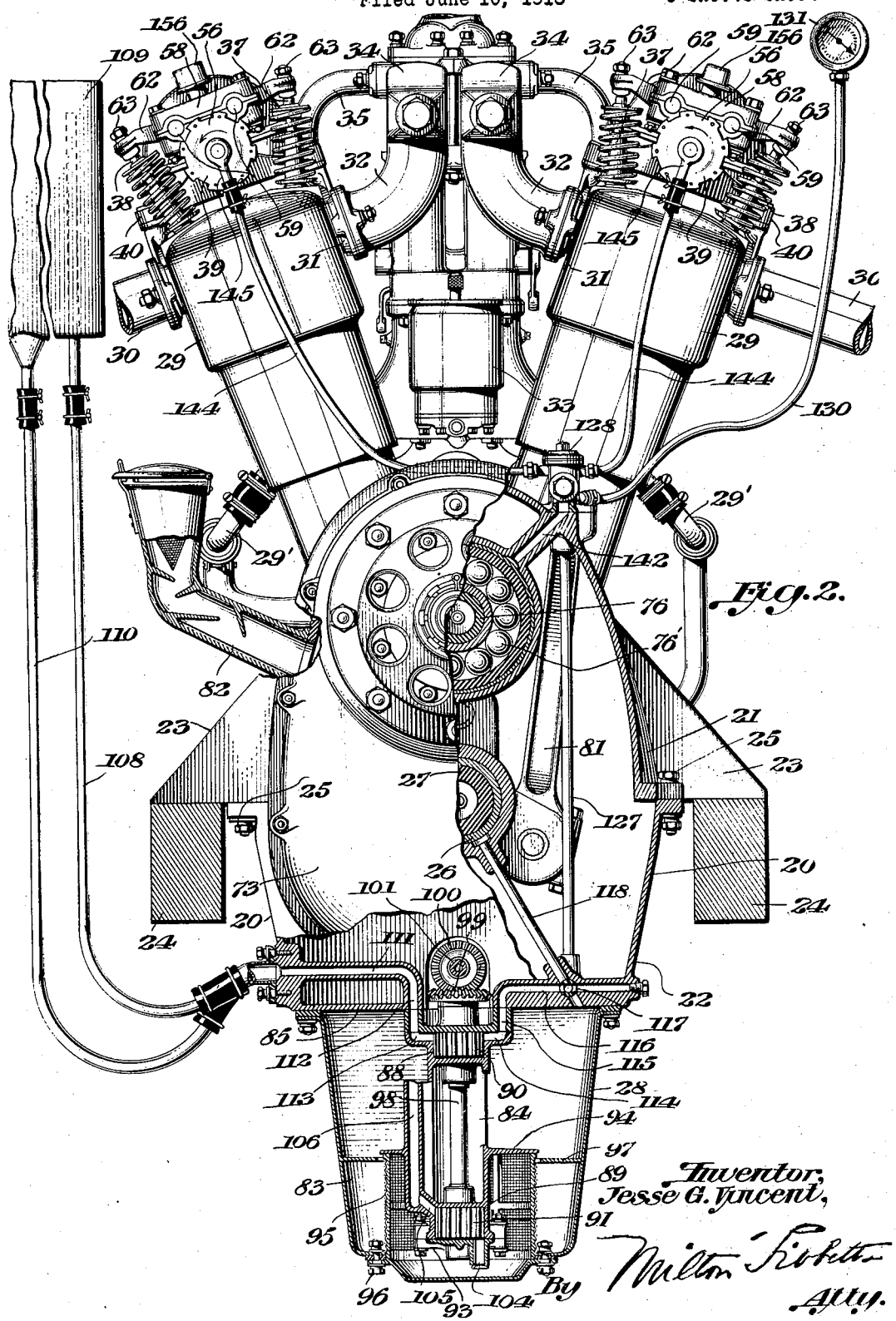

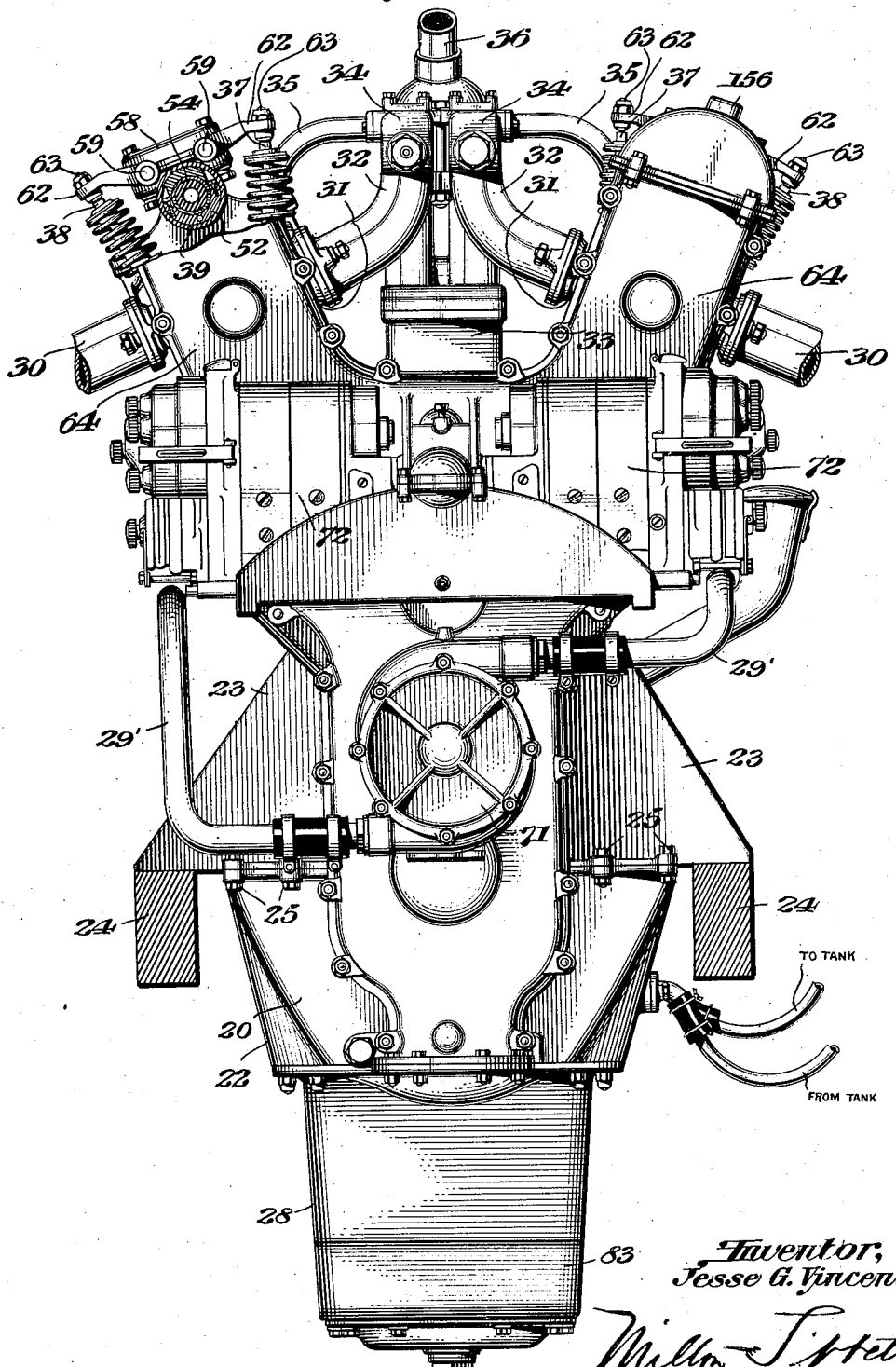

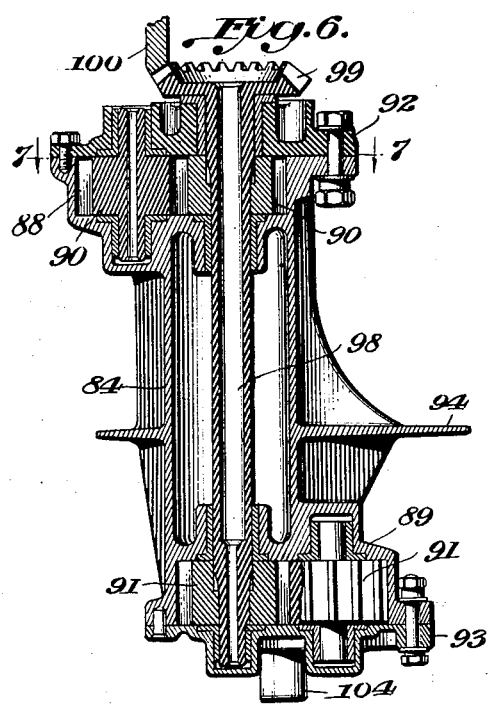

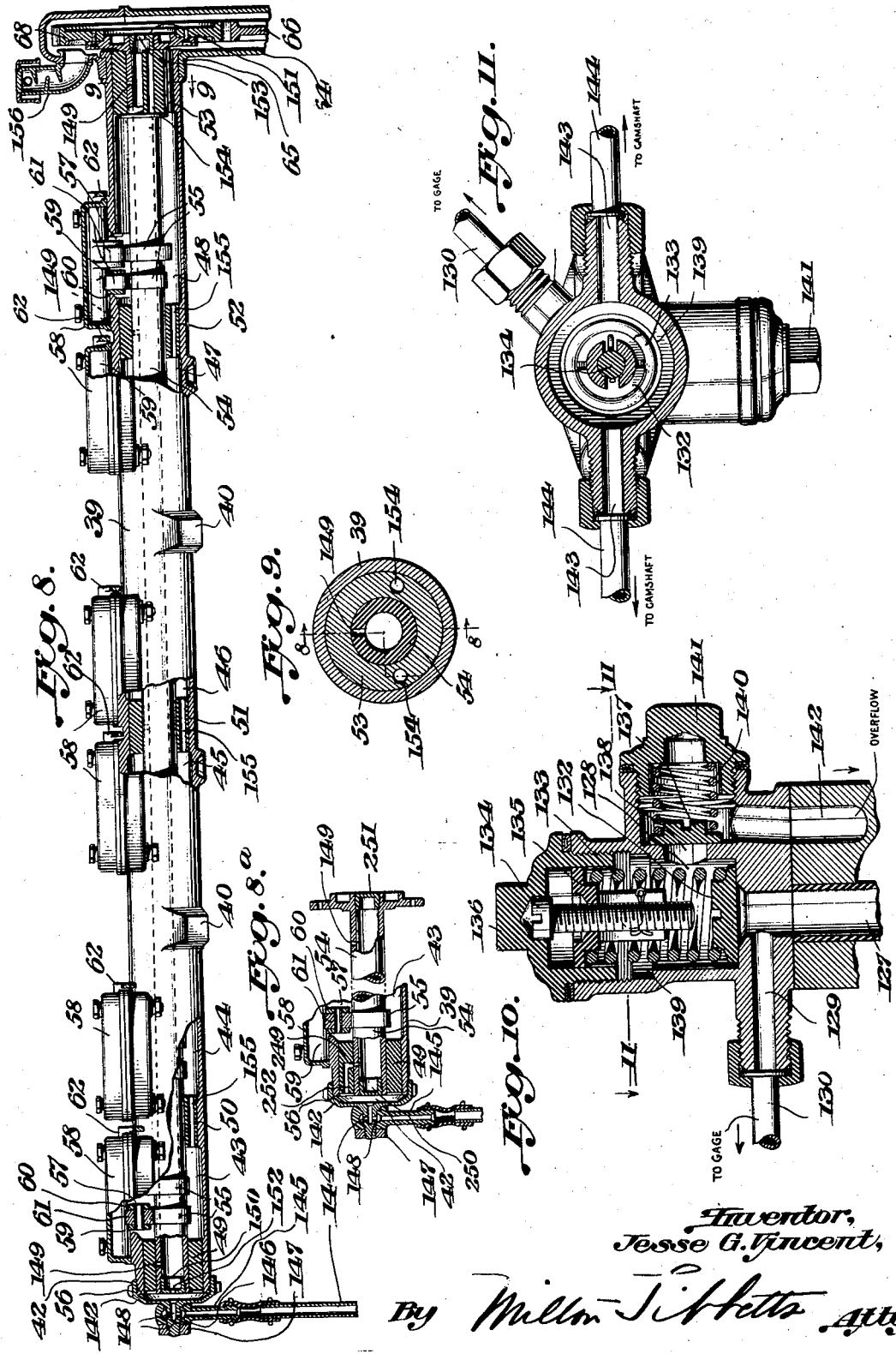

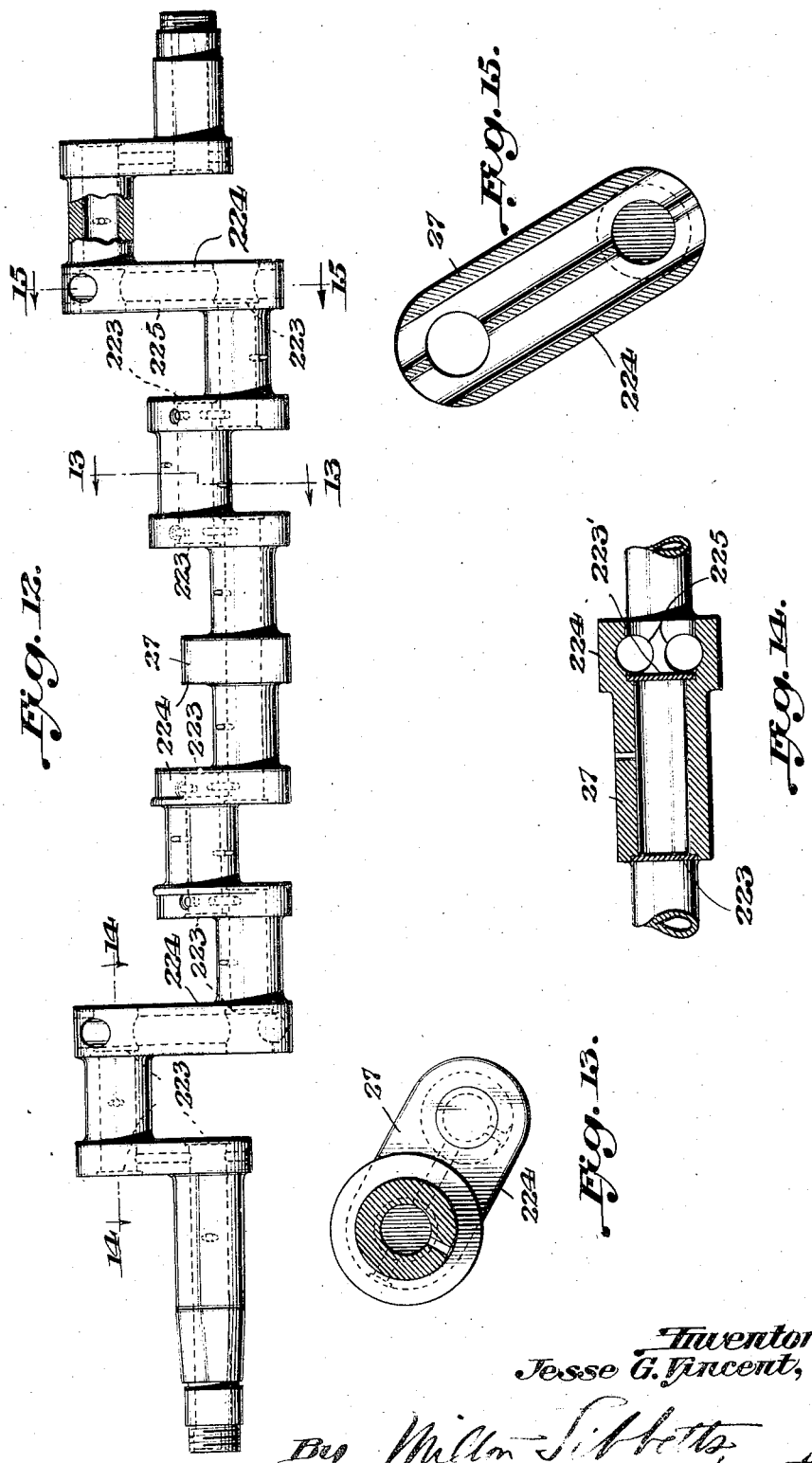

1,676,418

UNITED STATES PATENT OFFICE.

JESSE G. VINCENT, OF DAYTON, OHIO, ASSIGNOR TO PACKARD MOTOR CAR COMPANY, OF DETROIT, MICHIGAN, A CORPORATION OF MICHIGAN.

HYDROCARBON MOTOR.

Application filed June 10, 1918. Serial No. 239,206.

This invention relates to hydrocarbon motors and particularly to the lubrication thereof, and it is in part a division of pending application Serial No. 123,716, filed October 4, 1916, and in part a continuation thereof.

One of the objects of the invention is to provide an efficient lubricating system for the moving parts of the motor, and particularly for the valve operating mechanism and for the crank shaft bearings.

Other objects and features of the invention will appear from the following description taken in connection with the drawings which form a part of this specification, and in which:

Fig. 1 is a vertical section and part elevation of a hydrocarbon motor embodying the invention;

Fig. 2 is a front elevation view of the motor shown in Fig. 1, parts being cut away to illustrate interior construction;

Fig. 3 is a rear elevation view of the motor shown in Figs. 1 and 2, with parts cut away;

Fig. 4 is an enlarged horizontal section through a portion of the crank case of the motor, showing parts in plan view;

Fig. 5 is a vertical section substantially on the line 5—5 of Fig. 4;

Fig. 6 is a vertical section substantially on the line 6—6 of Fig. 5;

Fig. 7 is a plan view of the pump mechanism shown in Fig. 6, with the upper plate and other parts removed, the view being substantially on the line 7—7 of Fig. 6;

Fig. 8 is a side view and part section of one of the valve shaft housings and associated mechanism, the section near the right end of the figure being on the line 8—8 of Fig. 9;

Fig. 8ᵃ is a sectional view similar to the left end of Fig. 8, showing another form of means for feeding the oil to the valve shaft;

Fig. 9 is a transverse section on the line 9—9 of Fig. 8;

Fig. 10 is an enlarged vertical sectional view of a valve device used in the oil circulation system;

Fig. 11 is a section on the line 11—11 of Fig. 10;

Fig. 12 is a detail view of the motor crank shaft;

Fig. 13 is an enlarged sectional view on the line 13—13 of Fig. 12;

Fig. 14 is an enlarged sectional view on the line 14—14 of Fig. 12; and

Fig. 15 is an enlarged sectional view on the line 15—15 of Fig. 12.

The invention is illustrated in a hydrocarbon motor of V-type, the particular motor shown being a twelve cylinder motor with the cylinders arranged at an included angle of approximately 40°. Some of the features of the invention are equally applicable to other particular types or forms of motors. It will be understood that the application of the invention is limited only as appears in the claims.

Referring to the drawings, 20 represents the motor crank case made in upper and lower parts 21 and 22 respectively. The crank case has side arms 23 which rest upon longitudinal supports 24.

The two parts 21 and 22 of the crank case are bolted together as by bolts 25 and main bearings 26 for the motor crank shaft 27 are clamped between these parts. The lower part 22 of the crank case is open and is covered by a pan 28 which forms the bottom of the crank case and is in fact an oil well into which the oil which may be fed to various bearings in the crank case drains and is collected for recirculation.

In the particular motor shown there are three cylinder blocks 29 in each of the series of cylinders, there being two cylinders to each block. These cylinders are supported upon the crank case in the V form above referred to and are shown as water jacketed for cooling purposes, the water being supplied by a water manifold 29′. Along the outer sides of these cylinders are the exhaust ports 30 and along the inner sides are the intake ports 31. Intake manifolds 32 carry the combustion gases from a carburetor 33 to the intake ports 31. As shown the manifolds 32 are water jacketed as at 34, water being carried by pipes 35 from the tops of the cylinders to the jacket and discharged through a pipe 36 to a suitable radiator. Each of the cylinders has an intake valve 37 and an exhaust valve 38 and there is a valve shaft and operating mechanism in the form of a detachable unit for each of the sets of cylinders. Each such unit comprises a tubular valve shaft or cam shaft casing or housing 39 which extends lengthwise of the motor between the upstanding valves. This casing is mounted on top of and connects the several alined cylinder blocks, as by the legs 40 and bolts 41. It is divided into several compartments 42, 43, 44, 45, 46, 47 and 48 by bearings 49, 50, 51, 52 and 53, and others which are not shown in the sectional view, Fig. 8. A valve shaft or cam shaft 54 extends through the various bearings with cams 55 arranged thereon in the various compartments except compartment 42 which is the front end compartment. The cam shaft 54 extends through the bearing 49 into said compartment 42, the latter being very small as compared with the other compartments and being formed largely by a cap 56 screwed onto the end of the casing.

The various compartments of the casing 39, except the compartment 42, are formed with top openings 57 above the various cams on the cam shaft. Each of these openings has a cover 58 and between the cover and the casing is pivotally supported one or more rock shafts 59. Each rock shaft has an arm 60 upon which is a roller 61 in contact with one of the cams 55 of the cam shaft, and the end of the rock shaft that extends outside of the cam shaft casing is provided with an arm 62 having an adjustable plunger 63 in contact with the stem of one of the valves 37, 38.

At one end of the motor, the right end in Fig. 1, a housing 64 extends from the upper part of the crank case to the two casings 39. As shown particularly in Fig. 3, this housing 64 is of Y-form and at the upper ends of the two branches of the housing detachable connections are made with the casings 39, as shown at 65. This housing 64 may be made up of various detachable parts, and it contains a train of driving gears 66 extending from the crank shaft 27, on which is a gear 67 of the train, to the two cam shafts 54 on which are gears 68 of the train.

It will be seen that the housing 64 also extends downwardly beyond the upper part of the crank case, being formed by a partition 69 which extends both above and below the main end bearing 26 of the crank shaft. At the lower end of this partition 69, however, there is a passage 70 between the housing 64 and the interior of the crank case. This passage 70 is formed by overlapping parts of the partition so that oil which may drain to the lower part of the housing 64 will be trapped at a given level to oil-seal the passage and thereby prevent the return flow of gases therethrough, as will be hereinafter more fully described.

One of the gears of the train 66 is connected to operate a water pump 71 and another is connected to operate one or more magnetos 72.

At the opposite end of the motor from the housing 64 is a housing 73 in which are driving gears 74 and 75, the former being mounted on the end of the crank shaft 27 which extends through the forward end bearing 26 into the compartment formed by the housing 73, and the other of which is secured to a shaft 76 mounted parallel to the crank shaft and extending through the front of the cover 73 where it is connected to an airplane propeller 77. It will be understood that the shaft 76 is mounted in suitable bearings in the housing 73 and that the gear connection 74, 75 is for driving the airplane propeller 77 from the crank shaft.

The compartment formed by the housing 73 is also separated from the interior of the crank case by a partition 78 which extends both above and below the front bearing 26, and as shown this partition has two parallel walls, and by forming a lower opening 79 in the front wall and a somewhat higher opening 80 in the rear wall an oil seal is also formed at this end of the motor to prevent any gases from blowing into the housing 73 from the crank case, while at the same time permitting oil above a certain level to flow from the housing to the crank case.

It will be understood that the crank shaft 27 is rotated in its bearings in the crank case and that it is connected to the pistons of the motor by suitable connecting rods 81. The reciprocation of the pistons within the cylinders causes slight changes in the density of the gases within the crank case and for the purpose of equalizing the pressures a breather tube 82 is provided, this tube being also used as an oil filling opening. As there is usually more or less condensation taking place in the crank case it is desirable to prevent the gases therein which carry the moisture with them from reaching other parts of the motor where the moisture would be detrimental, which accounts for the traps 70 and 79 above referred to.

The bottom cover 28 has a depression or well 83 into which drains all the oil that finds its way into the crank case. The invention contemplates withdrawing the oil from this well, pumping it to a storage or cooling tank, and then withdrawing it from the tank and feeding it to the bearings of the motor as required. Thus the crank case is kept substantially dry because the withdrawing pump is of greater capacity than the feeding pump, and there is no undue splashing of oil in maneuvering when the motor is used for airplane work.

A pump device 84 extends into the well 83 being suspended from a partition 85 formed as an integral part of the crank case and supporting one of the intermediate main bearings 26. A shelf or flange 86 on the partition forms the support to which the device 84 is detachably secured as by bolts 87. The device comprises upper and lower pump chambers 88 and 89, in which are gears 90 and 91 respectively, forming the pumps. A detachable upper plate 92 and a similar lower plate 93 retain the gears in place.

The pump device is also formed with an intermediate transverse web 94 which abuts against the top of a cylindrical screen 95 which is detachably secured to the bottom of the cover 28 from the outside thereof, as by bolts 96. A ledge 97 in the well 83 extends inwardly to a point close to the web 94 and the screen 95 to better retain therein any dirt or sediment that may be collected.

A pump shaft 98 extends vertically through a gear of each of the pumps and is driven through bevel gears 99 and 100 from a horizontal shaft 101 mounted in the crank case and extending to one end of the motor where it is geared to the crank shaft as by gears 102 and 103, the latter meshing with gear 67 above described.

The lower pump 89 may be called the withdrawing pump as its inlet 104 is in the bottom of the well 83 within the screen 95, and its outlet 105 carries the oil through a vertical conduit 106, horizontal conduit 107, and pipe 110 to a tank or cooler 109 mounted adjacent to the motor. The upper pump 88 may be called the feeding pump as it takes the oil from the tank 109 through pipe 108, horizontal conduit 111, vertical conduit 112 and inlet 113, and feeds it to the various bearings of the motor, its outlet 114 connecting through conduits 115 and 116 with a distributing pipe 117 for that purpose.

The pipe 117 extends lengthwise of the motor through the partitions in the crank case and has branches 118 leading to the main bearings 26. There is one such branch 118 for each of the end bearings 26 and two of similar size for each of the intermediate bearings, all of these branches being located between double walls 119 of the various partitions. Some of the oil led to the main bearings reaches the connecting rod bearings through the hollow crank shaft. Thus in Fig. 1 it will be seen that the bearing parts of the crank shaft 27 are drilled out as at 120 and 121 and connected by a drilled conduit 122 and the ends of the drilled out parts 120 and 121 are closed as by plugs 123 and a tie rod 124 to which they are threaded. Oil holes 125 lead directly to the bearing surface of connecting rod bearings 126.

The crank shaft 27 is shown in detail in Figs. 12 to 15 where a different form of plugs 223 is illustrated. The plugs 223 are metal disks originally of concavo-convex form, expanded into place against the shoulders formed for them. This is a four bearing crank shaft with six crank throws and the cheeks 224 between two adjacent throws are each made rather large and drilled lengthwise as at 225, two drilled holes being shown, to thereby lighten the shaft considerably without weakening it. The plug 223', as shown in Fig. 14 for instance, is set into the shaft beyond the holes 225 so that the latter do not interfere with closing the bore.

The pipe 117 also has a branch 127 leading to a valve device 128, shown as mounted on the upper half of the crank case just above one of the bearings 76' for the shaft 76 at the front end of the motor. Said valve device is shown in some detail in Figs. 10 and 11. It is drilled at 129 to connect with a pipe 130 leading to a gage 131 so that the full pressure in the pipe 117 through the branch 127 will show on the gage. The valve device has a main valve 132 backed by a spring 133 adjusted by a bolt 134 threaded into a nut 135. A cap 136 forms the abutment for the bolt which can only be adjusted by removing the cap. The pressure at which the valve 132 is to open is set to a gage before assembling and is not easily tampered with thereafter.

A secondary valve 137 controls the overflow port 138 from the valve chamber 139. It is backed by a spring 140 and a cap 141. The overflow from this valve passes through a conduit 142 to the bearing 76' above referred to, where it lubricates various parts within the housing 73 and flows back into the crank case through the trap 79.

The valve chamber 139 has two outlets 143 connecting with pipes 144 which lead respectively to the ends of the casings 39. With the cap 56 threaded on the end of each of the casings as shown, the connection of the pipe 144 thereto is by a swivel as shown particularly in Fig. 8. The swivel piece 145 at the end of the pipe is nicely fitted over the end of a cylindrical projection 146 on the cap and a nut 147 retains it thereon. Drilled openings 148 insure the oil passing directly into the compartment 42.

Compartment 42, as above pointed out, is the only compartment of the casing 39 in which there are no cams or operating mechanism. It receives the full pressure of oil from the pipe 144 which is substantially the same as in the pipe 117 after the motor has speeded up sufficiently to raise the valve 132. It is not desirable that this pressure should be maintained in the other compartments of the casing because of possible leakage through the bearings for the rocker arms. Consequently, except for leakage into the bearing 49, all of the oil is fed into the cam shaft 54, which is formed hollow for that purpose, through a restricted oil inlet means, and carried through to an oil outlet of greater capacity at the other end so that the pressure within the cam shaft is relieved. In fact, the inlet and outlet means for the cam shaft may be so related that centrifugal force only will remain to carry the oil to the bearings 50, 51, 52 and 53 through the oil holes 149.

The specific means shown for relieving the pressure in the cam shaft as above described, includes plugs 150 and 151 in the inlet and outlet ends respectively of the cam shaft shown in Fig. 8. The plug 150 has a small opening 152 therein which permits the passage of a measured quantity of oil from the pipe 144, and the plug 151 has a relatively larger opening 153 which permits of unrestricted passage of surplus oil to the housing 64 where it passes over the gears and bearings therein to the trap 70 and back into the crank case.

It will be seen that the opening 153 is at the center of the plug so that when the cam shaft is rotating rapidly the oil within the shaft will, due to its viscosity and to centrifugal force, bank up on the inner wall of the shaft and escape only after the shaft is full except at its extreme center. Thus there is always plenty of oil in the shaft for the bearings and yet no pressure beyond that produced by centrifugal force within the shaft itself. Also, this arrangement permits of a rather large amount of oil being fed into and through the cam shaft to reach the gears in the housing 64 without flooding the cam shaft bearings and housing.

Of course some of the oil will escape past the cam shaft bearings into the casing 39 and it is intended that sufficient oil shall be kept therein to permit the cams to dip and provide splash lubrication for the rocker arms. A given level therefore is normally maintained within the casing by the provision of ample outlets 154 formed longitudinally in the end bearing 53 above the bottom of the casing, these outlets leading into the housing 64. The outlets are shown both in Figs. 8 and 9, the section through the lower half of bearing 53 at the right end of Fig. 8 being on the line 8—8 of Fig. 9.

All of the intermediate bearings, 50, 51 and 52, are provided with longitudinal holes 155 so that the oil from one compartment may pass into the next.

A breather 156 is provided in the upper part of the housing 64 as shown in section in Fig. 8, to permit escape of any gases that may be carried over with the oil and discharged into said housing.

In Fig. 8ª another form of means is shown for feeding the oil under pressure to the cam shaft. This form may be used where it is desired to feed a limited quantity of oil to the cam shaft and to the gears in the housing 64. The formed end of the cam shaft is plugged as shown at 250 and the rear end may also be plugged as at 251 so that whatever oil is fed to the interior of the cam shaft can pass out only through the oil holes 149. A restricted oil inlet means to the interior of the cam shaft is provided by a conduit 252 which leads from the compartment 42 to a point on the inner surface of the bearing 49 where it will communicate at each revolution of the cam shaft 54 with a radial opening 249 in said shaft.

Other forms and modifications of the illustrated structure may be made without departing from the spirit or scope of the invention.

Having thus described my invention, what I claim and desire to secure by Letters Patent is:

1. In a hydrocarbon motor, in combination, a tubular casing divided by bearings into several compartments, a cam shaft in said casing mounted in said bearings, rock shafts mounted in the upper part of said casing and operated by said cam shaft, means for feeding oil to said casing, and means including the cam shaft for splashing oil to the bearings of said rock shafts.

2. In a hydrocarbon motor, the combination with the crank case thereof, of cylinders mounted thereon, driving gearing at one end of the motor, a housing for said gearing, means for feeding oil to said housing to lubricate said gearing, and means connecting the lower part of said housing with said crank case so that the oil may pass from the former to the latter without permitting the passage of gases from the crank case to the housing.

3. In a hydrocarbon motor, the combination with the crank case thereof, of cylinders mounted thereon, driving gearing at one end of the motor, a housing for said gearing, and a trapped oil connection between the lower part of said housing and said crank case.

4. In a hydrocarbon motor, the combination with a hollow valve shaft, of a casing therefor, a cap over the end of said casing and said shaft, an oil pipe angularly adjustable on said cap and communicating with the interior of said shaft through said cap, and means for feeding oil to said pipe.

5. In a hydrocarbon motor, the combination with a crank case, a crank shaft having bearings therein, and cylinders mounted on the crank case, of an oiling system comprising an oil pump, a pipe leading therefrom and having branches extending to the crank shaft bearings, another branch pipe leading from said pipe to the motor cam shaft, and means for draining the oil from the cam shaft to the crank case.

6. In a hydrocarbon motor, the combination with a crank case, a crank shaft having bearings therein, cylinders mounted on the crank case, a valve shaft arranged along the tops of the cylinders, gearing at one end of the motor for driving the valve shaft, and a housing for said gearing, of an oil system comprising an oil pump, a pipe leading therefrom and having branches extending to the crank shaft bearings, another branch pipe leading from said pipe to said valve shaft for lubricating the bearings thereof, and means for carrying the oil from said valve shaft over said gearing and through said housing to the crank case.

7. In a motor, the combination with a hollow shaft, of a casing having bearings, said shaft having oil holes leading to said bearings, means for feeding oil under pressure to the interior of said shaft, and means comprising an outlet in addition to said oil holes for relieving the pressure within the shaft.

8. In a hydrocarbon motor, the combination with a hollow valve shaft, of a casing having bearings, said shaft having oil holes leading to said bearings, means for feeding oil under pressure to the interior of said shaft, and an additional conduit communicating directly with the interior of said shaft and relieving the pressure therein.

9. In a motor, the combination with a hollow rotatable shaft, of a casing having bearings, said shaft having oil holes leading to said bearings, means for feeding oil under pressure to the interior of said shaft, and means comprising an outlet in addition to said oil holes for relieving the pressure within the shaft.

10. In a hydrocarbon motor, the combination with a hollow valve shaft, of a casing having bearings for said shaft, said shaft having oil holes leading to said bearings, means for feeding oil under pressure to the interior of said shaft at one end thereof, and means at the other end of said shaft and centrally thereof for relieving the pressure within the shaft while permitting oil to be fed by centrifugal force to said oil holes.

11. In a hydrocarbon motor, the combination with a casing, of a hollow valve shaft mounted in bearings therein and having oil inlet means at one end and oil outlet means at the other end, said outlet means having greater capacity than said inlet means and said shaft having oil holes leading to said bearings, and means for feeding oil under pressure to said inlet means.

12. In a hydrocarbon motor, the combination with a casing, of a hollow valve shaft mounted in bearings therein and having oil inlet means at one end and oil outlet means at the other end, said outlet means having greater capacity than said inlet means and said shaft having oil holes leading to said bearings, and means for feeding oil under pressure to said inlet means, and means for draining oil from said casing at a given level.

13. In a hydrocarbon motor, the combination with a casing, of a hollow valve shaft mounted in bearings therein and having oil holes leading to said bearings, said shaft having oil inlet means at one end and oil outlet means at the other end, means for feeding oil under pressure to said inlet means, said inlet and outlet means being so relatively proportioned that pressure within the shaft is reduced relative to the feeding pressure and the oil fed through said oil holes to the bearings substantially by centrifugal force only.

14. In a hydrocarbon motor, the combination with a casing, of a hollow cam shaft in bearings therein and having oil holes to said bearings, means for feeding oil under pressure to said cam shaft through a restricted inlet opening at one end thereof, said cam shaft having an outlet opening at the other end thereof of greater capacity than said inlet opening, and means for carrying the oil away from said outlet opening.

15. In a hydrocarbon motor, the combination with a casing, of a hollow cam shaft in bearings therein and having oil holes to said bearings, means for feeding oil under pressure to said cam shaft through a restricted inlet opening at one end thereof, said cam shaft having an outlet opening at the center of the other end thereof of greater capacity than said inlet opening, whereby the pressure is relieved within said shaft and the oil carried to the oil holes by centrifugal force.

16. In a hydrocarbon motor, the combination with a casing, of a hollow cam shaft in bearings therein and having oil holes to said bearings, means for feeding oil under pressure to one end of said casing, said cam shaft having a restricted inlet opening connecting that part of the casing to which oil is so fed with the interior of the cam shaft and having a relatively unrestricted opening at its opposite end beyond the casing, for the purpose described.

17. In a hydrocarbon motor, the combination of a crank case, cylinders thereon, a gear casing at either end of the crank case and separated therefrom by a partition having a trap therein to permit oil to flow from the gear casing to the crank case without permitting gases to blow back into the gear casing, and means for feeding oil to said gear casings from the crank case.

18. In a hydrocarbon motor, the combination of a crank case, cylinders thereon, a gear casing at the end of the crank case and separated therefrom by a partition having a trap therein to permit oil to flow from the gear casing to the crank case without permitting gases to blow back into the gear casing, and means for feeding oil to said gear casing.

19. In a hydrocarbon motor, the combination of a crank case, cylinders thereon, a gear casing at either end of the crank case and separated therefrom by a partition having a trap therein to permit oil to flow from the gear casing to the crank case without permitting gases to blow back into the gear casing, a valve shaft casing on top of the cylinders, and means for feeding oil from the crank case to the valve shaft casing with overflow to said gear casings.

20. In a hydrocarbon motor, in combination, a crank case, a crank shaft mounted in bearings therein, cylinders mounted on the crank case, a valve shaft mounted at the tops of the cylinders, an oil pump in the crank case, a pipe for carrying oil from said pump to the crank shaft bearings, a branch leading from said pipe to said valve shaft, and a relief valve in said branch.

21. In a hydrocarbon motor, in combination, a crank case, a crank shaft mounted in bearings therein, cylinders mounted on the crank case, a valve shaft mounted at the tops of the cylinders, an oil pump in the crank case, a pipe for carrying oil from said pump to the crank shaft bearings, a branch leading from said pipe to said valve shaft, a relief valve in said branch, and means for carrying the oil from said valve to another bearing of the motor.

22. In a hydrocarbon motor, in combination, a crank case, a crank shaft mounted in bearings therein, cylinders mounted on the crank case, a valve shaft mounted at the tops of the cylinders, a gear casing at one end of the motor, an oil pump in the crank case, a pipe for carrying oil from the pump to the crank shaft bearings, a branch leading from said pipe to said valve shaft, and a relief valve in said pipe, the oil passing through said relief valve passing into said gear casing.

23. In a hydrocarbon motor, in combination, a crank case, a crank shaft mounted in bearings therein, a cam shaft, a pump in the crank case, a pipe for carrying the oil to the crank shaft bearings, a branch from said pipe to said cam shaft, and a valve in said branch restricting passage of oil therethrough below a predetermined pressure.

24. In a hydrocarbon motor, in combination, a crank case, a crank shaft mounted in bearings therein, a cam shaft, a pump in the crank case, a pipe for carrying the oil to the crank shaft bearings, a branch from said pipe to said cam shaft, and a valve device in said branch restricting passage of oil therethrough below a predetermined pressure and relieving the oil in said branch at a higher predetermined pressure.

25. In a hydrocarbon motor, the combination of a crank case comprising upper and lower halves, said crank case having partitions therein for supporting the main bearings of the crank shaft, an oil pan detachably secured to the lower half of the crank case and forming an oil well, and an oil pump device secured to one of said partitions and extending into said well.

26. In a hydrocarbon motor, the combination of a crank case comprising upper and lower halves, said crank case having partitions therein for supporting the main bearings of the crank shaft, an oil pan detachably secured to the lower half of the crank case and forming an oil well, and an oil pump device suspended from said partition and extending into said well, said device having oil leads to the bearings of the motor.

27. In a hydrocarbon motor, the combination of a crank case having an open lower part, an oil pan covering said opening and receiving the oil from the lubricated motor parts and having an oil screen therein, and an oil pump device mounted in said crank case and extending into said screen, the parts being so arranged that the screen is removed from the pump device when said pan is removed.

28. In a hydrocarbon motor, the combination with a crank case, of an oil pump device therein comprising upper and lower pumps and a single operating shaft for said pumps, and a horizontal driving shaft connected to said pump shaft and having geared connection with the motor crank shaft.

29. In a hydrocarbon motor, the combination with a crank case having an open bottom, of an oil pan covering said opening and forming an oil well for receiving and collecting the oil from the motor, an oil pump device detachably secured to the crank case and extending into said well, said device comprising a lower pump adapted to draw oil from said well and an upper pump adapted to supply oil to the motor bearings, and driving connections from the motor crank shaft to said pumps.

30. In a hydrocarbon motor, the combination with a crank case, crank shaft supports carried by said crank case, of an oil tank separate from said crank case and a pump device carried by one of said supports and extending into said tank.

31. An engine crank shaft comprising a main bearing part, a crank part, an arm connecting said parts, a second arm connected to the crank part, said second arm having a drilled opening extending lengthwise thereof to lighten it, and said crank part and the arm connecting it with the main bearing part having means for feeding oil to the bearing surface of said crank part but without communicating with the opening in the second arm.

32. An engine crank shaft comprising two separated main bearing parts, two cranks arranged between said bearing parts and each connected to its adjacent bearing part, said shaft having oil holes leading from its main bearing parts to the bearing surfaces of the adjacent cranks respectively but without oil communication between the cranks.

33. A crank shaft comprising a main bearing part, a crank part, an arm connecting said parts, a second arm connected to the crank part, said second arm having a drilled opening extending lengthwise thereof, and said crank part being drilled and having plugs at its ends, one of said plugs being inside of the drilled out portion of the latter said arm.

34. In a hydrocarbon motor, the combination with a hollow valve shaft, of a casing having bearings for said shaft, said shaft having oil holes leading to said bearings and one of said bearings having an oil conduit in communication with one of said oil holes, and means for feeding oil under pressure to said conduit.

35. In a hydrocarbon motor, the combination with a hollow valve shaft plugged at both ends, of a casing having bearings for said shaft, said shaft having oil holes leading to said bearings and one of said bearings having a conduit communicating with one of said oil holes at each revolution of the valve shaft, and means for feeding oil under pressure to said conduit.

36. In a motor, in combination, a hollow shaft, a casing having bearings for the shaft, and a source of oil under pressure connected to feed oil to the interior of said shaft, said shaft and said casing having oil outlets so arranged that oil reaches said bearings from the shaft, that pressure is relieved within the shaft, and that the oil drains from the casing to maintain a substantially constant level therein.

37. In a motor, in combination, a hollow shaft, a casing having bearings for the shaft, and a source of oil under pressure connected to feed oil to the interior of said shaft, said shaft and said casing having oil outlets so arranged that oil is fed by centrifugal force only from said shaft to said bearings.

38. In a motor, in combination, a hollow shaft, a casing having bearings for the shaft, and a source of oil under pressure connected to feed oil to the interior of said shaft, said shaft and said casing having oil outlets so arranged that oil is fed by centrifugal force only from said shaft to said bearings, and is drained from the casing to maintain a substantially constant level therein.

39. In a motor, in combination, a hollow shaft, a casing having bearings for the shaft, and a source of oil under pressure connected to feed oil to the interior of said shaft, said shaft and said casing having oil outlets so arranged that pressure is relieved within the shaft independently of the bearings and oil is drained from the casing to maintain a substantially constant level therein.

40. In a motor, the combination with a casing, of a hollow cam shaft mounted for rotation in the casing, pressure oil feeding means, restricted oil inlet means from said feeding means, said inlet means being mounted within the hollow cam shaft, and outlet means from said cam shaft having capacity greatly in excess of that of the inlet means.

In testimony whereof I affix my signature.

JESSE G. VINCENT.